United States Patent
Song et al.

(10) Patent No.: US 10,811,741 B2
(45) Date of Patent: Oct. 20, 2020

(54) BATTERY PACK FOR UNIFORM COOLING OF MODULES AND COOLING METHOD OF BATTERY PACK

(71) Applicant: Samsung Electronics Co., Ltd., Suwon-si (KR)

(72) Inventors: Tae Won Song, Yongin-si (KR); Jin Ho Kim, Yongin-si (KR); Dong Kee Sohn, Seoul (KR); Tae Jung Yeo, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 911 days.

(21) Appl. No.: 15/402,687

(22) Filed: Jan. 10, 2017

(65) Prior Publication Data

US 2017/0200993 A1   Jul. 13, 2017

(30) Foreign Application Priority Data

Jan. 12, 2016   (KR) .................. 10-2016-0003849

(51) Int. Cl.
| | | |
|---|---|---|
| *H02J 7/04* | (2006.01) | |
| *H02J 7/16* | (2006.01) | |
| *H01M 10/633* | (2014.01) | |
| *H01M 10/0525* | (2010.01) | |
| *H01M 10/48* | (2006.01) | |
| *H01M 10/6568* | (2014.01) | |
| *H01M 10/6557* | (2014.01) | |

(52) U.S. Cl.
CPC ..... *H01M 10/633* (2015.04); *H01M 10/0525* (2013.01); *H01M 10/486* (2013.01); *H01M 10/6557* (2015.04); *H01M 10/6568* (2015.04)

(58) Field of Classification Search
CPC .......... H01M 10/633; H01M 10/6557; H01M 10/6568; H01M 10/0525; H01M 10/486
USPC .......................................................... 320/153
See application file for complete search history.

(56) References Cited

U.S. PATENT DOCUMENTS

| | | | |
|---|---|---|---|
| 8,535,823 B2 | 9/2013 | Song et al. | |
| 8,647,763 B2 | 2/2014 | Tennessen et al. | |
| 2012/0225341 A1* | 9/2012 | Major | B60H 1/00278 |
| | | | 429/120 |
| 2013/0241490 A1* | 9/2013 | Kim | H01M 10/443 |
| | | | 320/112 |
| 2013/0244077 A1* | 9/2013 | Palanchon | F28F 3/12 |
| | | | 429/120 |
| 2014/0072845 A1 | 3/2014 | Oh et al. | |
| 2014/0193683 A1 | 7/2014 | Mardall et al. | |

FOREIGN PATENT DOCUMENTS

| | | |
|---|---|---|
| CN | 103855441 A | 6/2014 |
| JP | 2006-185778 A | 7/2006 |
| KR | 2001-0059123 A | 7/2001 |
| KR | 10-2007-0042653 A | 4/2007 |
| KR | 10-2010-0062576 A | 6/2010 |

(Continued)

*Primary Examiner* — Zixuan Zhou
(74) *Attorney, Agent, or Firm* — NSIP Law

(57) ABSTRACT

A battery pack includes: battery modules; a cooling pipe connected to the battery modules; and one or more cooling units connected to the cooling pipe and configured to absorb heat from cooling liquid flowing inside the cooling pipe, wherein the battery modules and the one or more cooling units are disposed to alternate with respect to each other.

11 Claims, 19 Drawing Sheets

(56) References Cited

FOREIGN PATENT DOCUMENTS

| KR | 10-1371741 B1 | 3/2014 |
| KR | 10-2014-0058759 A | 5/2014 |
| KR | 10-2015-0034500 A | 4/2015 |

* cited by examiner

BATTERY PACK FOR UNIFORM COOLING OF MODULES AND COOLING METHOD OF BATTERY PACK

CROSS-REFERENCE TO RELATED APPLICATIONS

This application claims the benefit under 35 USC 119(a) of Korean Patent Application No. 10-2016-0003849 filed on Jan. 12, 2016 in the Korean Intellectual Property Office, the entire disclosure of which is incorporated herein by reference for all purposes.

BACKGROUND

1. Field

The following description relates to a battery pack and a cooling method of a battery pack.

2. Description of Related Art

A battery generates heat because an electrochemical reaction occurs in a process of using the battery. A battery should be maintained at a constant temperature in order to continuously use the battery for a long period of time. Therefore, a cooling device for absorbing generated heat may be provided at the battery.

A battery pack including multiple battery modules is commonly used to supply power in a large capacity system requiring high electrical power. Each battery module includes one or more battery cells, or batteries. Due to the amount of heat generated in such a battery pack, adequate cooling capability of a cooling device for the battery pack is important for stable operation of the system.

Generally, a cooling device is located outside a battery pack and cooling water is supplied from the cooling device with a serial or parallel structure to cool modules or cells inside the battery pack. However, a temperature difference between battery modules inside the battery pack may be generated and may cause a performance deviation and a lifespan deviation between the battery modules. Therefore, there is a need for an improved cooling structure and cooling operation to reduce a temperature deviation between modules.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In one general aspect, a battery pack includes: battery modules; a cooling pipe connected to the battery modules; and one or more cooling units connected to the cooling pipe and configured to absorb heat from cooling liquid flowing inside the cooling pipe, wherein the battery modules and the one or more cooling units are disposed to alternate with respect to each other.

The battery modules and the one or more cooling units may be disposed to alternate with each other in a one-by-one order to enable the cooling liquid to flow through a cooling unit among the one or more cooling units after passing through a battery module among the battery modules.

The cooling pipe and the one or more cooling units may be connected to each other to form a closed loop.

The one or more cooling units may include a cooling unit disposed at a central position and the battery modules may include battery modules disposed in positions surrounding the central cooling unit.

The battery modules disposed in positions surrounding the central cooling unit may be disposed in upper, lower, left, right, and diagonal directions from the central cooling unit.

The central cooling unit may include layers of components that are vertically stacked and aligned.

The central cooling unit may further include a first heat exchanger disposed in a layer among the layers of components, and a second heat exchanger disposed in another layer among the layers of components. The cooling pipe may include a first loop configured to circulate the cooling liquid to a first battery module among the battery modules disposed in the positions surrounding the central cooling unit, and to exchange heat with the first heat exchanger, and a second loop configured to circulate the cooling liquid to a second battery module among the battery modules disposed in the positions surrounding the central cooling unit, and to exchange heat with the first heat exchanger and the second heat exchanger.

The cooling pipe and the one or more cooling units may form two or more closed loops in which to flow the cooling liquid.

The battery pack may further include a valve disposed between the battery modules and the one or more cooling units, and configured to control a flow of the cooling liquid.

The battery pack may further include a temperature sensor configured to measure a temperature of each of the battery modules.

The battery pack may further include: a valve; and a controller configured to control the valve based on the measured temperature of each of the battery modules.

The valve may include valves. The controller may be configured to control the valves to selectively configure the cooling pipe and the one or more cooling units to form one closed loop or closed loops through which the cooling liquid flows.

In another general aspect, a cooling method of a battery pack includes: measuring, by a sensor, a temperature of each battery module among battery modules; transmitting temperature information corresponding to the measured temperature of each battery module to a controller; generating, based on the temperature information, a valve control signal at the controller; and operating a valve according to the valve control signal to control a flow of cooling liquid through a cooling pipe to at least one of the battery modules.

In response to the temperature information indicating that the temperature of a selected battery module among the battery modules is higher than the temperatures of other battery modules among the battery modules, the operating of the valve may include operating the valve to cause the cooling liquid to flow through the selected battery module a greater number of times in a cooling cycle than the cooling liquid is caused to flow through the other battery modules in the cooling cycle.

Other features and aspects will be apparent from the following detailed description, the drawings, and the claims.

Figure 1:
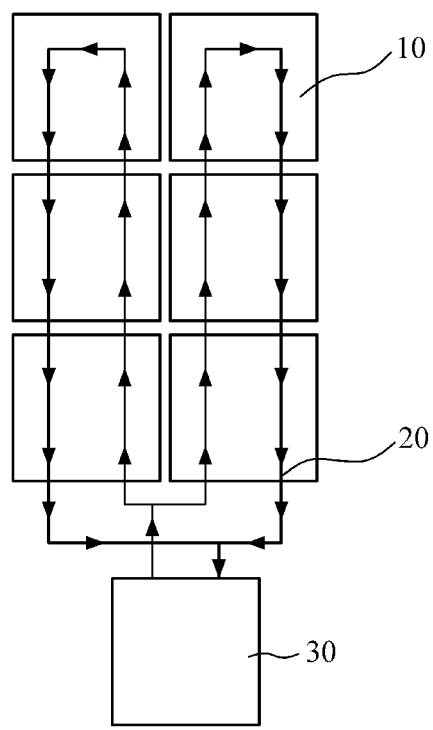
FIG. 1 is a diagram illustrating a battery pack of a serial cooling structure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
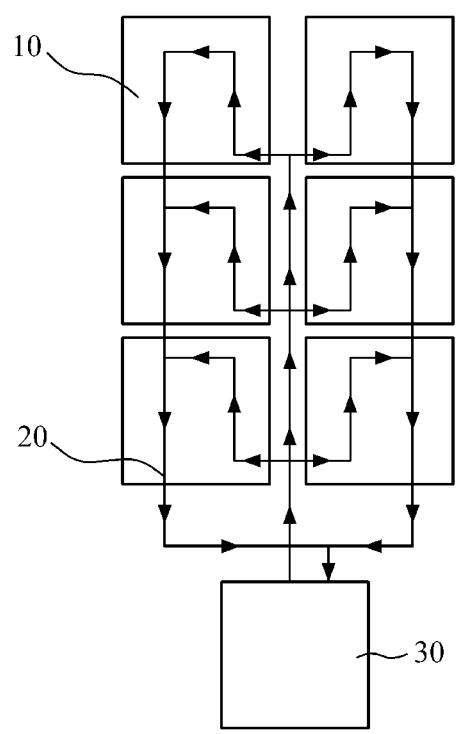
FIG. 2 is a diagram illustrating a battery pack of a parallel cooling structure.
Figure 3:
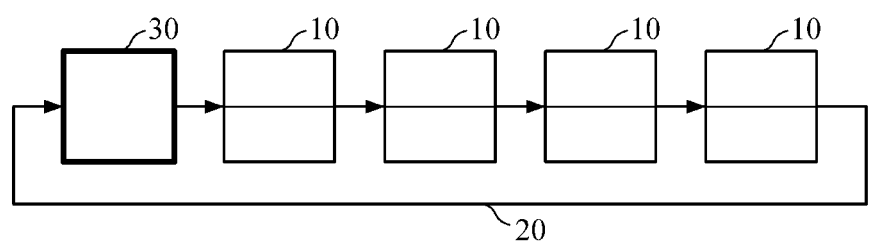
FIG. 3 is a schematic diagram for describing a serial cooling structure of a battery pack.
Figure 4:
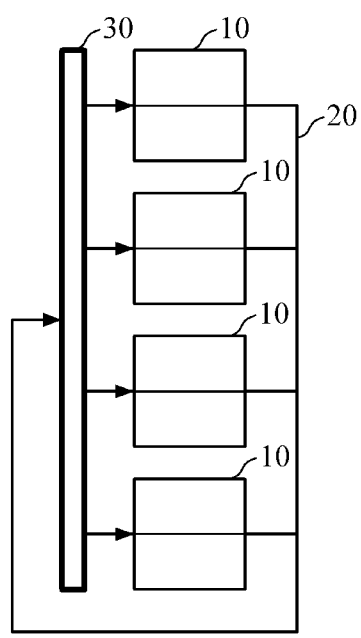
FIG. 4 is a schematic diagram for describing a parallel cooling structure of a battery pack.

FIGS. 1 and 2 illustrate example battery packs, and FIGS. 3 and 4 are schematic diagrams for describing example cooling structures of the battery packs of FIGS. 3 and 4, respectively.

With reference FIGS. 1 and 3, a serial cooling structure of a battery pack will be described. In an example, cooling water discharged from a cooling device 30 flows and circulates through battery modules 10 to absorb heat from the battery modules 30, and then flows back to the cooling device 30. However, in the serial cooling structure, a temperature difference between battery modules 10 disposed at a position at which the cooling water just discharged and flowing away from the cooling device 30 flows and battery modules 10 disposed at a position at which the cooling water circulated one time and flowing back into the cooling device 30 flows may occur, due to an increasing temperature of the cooling water along the serial cooling pathway. In other words, a temperature difference between a battery module 10 located in the vicinity of a cooling water inlet and a battery module 10 located in the vicinity of a cooling water outlet may occur. As described above, in such a serial cooling structure, the battery modules 10 are not uniformly cooled. Consequently, a battery pack of a serial cooling structure may have unsatisfactory operation stability.

In a different example, in a battery pack of a parallel cooling structure shown in FIGS. 2 and 4, a cooling deviation between the battery modules 10 due to a variation in a temperature of the cooling water along the cooling pathway may not occur, but a difference in a length of portions of a cooling pipe 20 which supply the cooling water from the cooling device 30 to each of the battery modules 10 may exist, thereby causing deviations in a flow rate of the cooling water at locations of the cooling pathway corresponding to the battery modules 10. Thus, a battery pack of a parallel cooling structure may have unsatisfactory operation stability.

Figure 5:
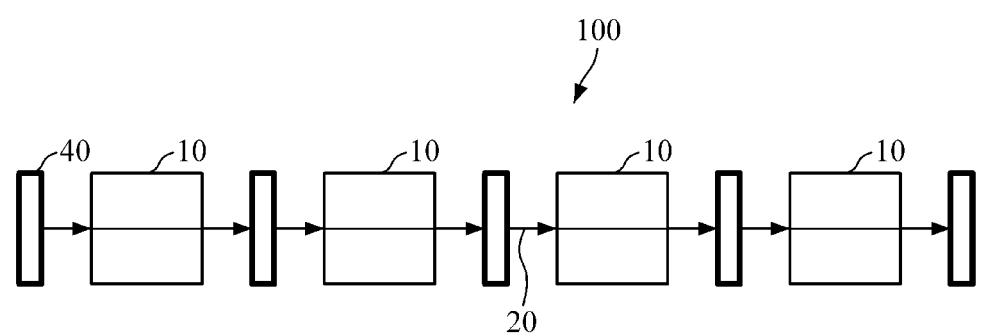
FIG. 5 is a schematic diagram of a battery pack, according to an embodiment.

FIG. 5 is a schematic diagram of a battery pack 100 for a uniform cooling of battery modules, according to an embodiment. With reference to FIG. 5, the battery pack 100 includes battery modules 10 and cooling units 40.

A battery module 10 is, for example, a battery assembly in which battery cells (not shown) are grouped in a predetermined number to be inserted into a frame so as to protect the battery cells from an external impact, heat, vibration and the like. A battery module 10 may be configured with about ten battery cells and may be a lithium ion battery. However, a battery module 10 is not limited to having a particular number of cells or having a particular construction or composition.

The cooling pipe 20 through which cooling water flows extends in, through or adjacent to the battery modules 10. The cooling water flowing in the cooling pipe 20 absorbs heat generated by the battery modules 10 so that the battery modules 10 are cooled. Therefore, the battery modules 10 may be maintained at a constant temperature even though it is used continuously for a long time. The cooling pipe 20 may be attached and disposed outside the battery modules 10 using an adhesive member. However, the cooling pipe 20 may have any shape and may be attached to or near the battery modules 10 in any suitable manner, so long as the cooling pipe 20 is disposed at the battery modules 10.

The cooling units 40 are connected to the cooling pipe 20 to absorb heat of the cooling water flowing in the cooling pipe 20. The cooling water absorbing the heat of a battery module 10 flows into an inlet of a respective cooling unit 40 connected to the cooling pipe 20. The cooling water flowing into a cooling unit 40 is cooled by radiating heat in the cooling unit 40. Consequently, the cooling water discharged from an outlet of a cooling unit 40 absorbs heat of a battery module 10 disposed downstream of the cooling unit 40. A cooling unit 40 may cool the cooling water using a refrigerant which circulates through a cooling circuit of the cooling unit 40 composed of a heat exchanger, a compressor, a condenser, and an expansion valve, and a unit for cooling the cooling water through air cooling.

The battery modules 10 and the cooling units 40 are alternately disposed with each other. Thus, a temperature deviation between the battery modules 10 is minimized by enabling the cooling water, which absorbs heat of one battery module 10 and rises in temperature, to flow to a cooling unit 40 disposed downstream of the one battery module 40 and then be cooled and directed to another battery module 10, instead of immediately flowing to another battery module 10 without being cooled. As a result, operational stability of the battery pack 100 is enhanced. Also, the sections of the cooling pipes 20 which respectively supply the cooling water to each of the battery modules 10 have a same length. Consequently, a deviation of a flow rate of the cooling water among the sections of the cooling pipe 20 battery modules is prevented or minimized.

The battery modules 10 and the cooling units 40 are alternately disposed one by one in FIG. 5 so as to enable the cooling water to flow to a cooling unit 40 after passing a single battery module 10. However, as shown in FIGS. 13A-13D, a battery pack may be configured to enable the cooling water to pass and cool one, two, three, or four battery modules and then to feed back to the cooling unit. In the examples of FIGS. 13A-13D, a structure of a battery pack may be simplified to reduce a size of the battery pack 100.

For example, in FIGS. 13A-13D, respective battery packs 100f-100i, according to additional embodiments, include a cooling pack 40 disposed at a central position and battery modules 10 disposed at perimeter positions around the cooling pack 40. In the battery pack 100f of FIG. 13A, a cooling pipe 20 includes a loop passing through one battery module 10, and is configured to enable cooling water to pass and cool the one battery module 10 and then feed back to the cooling pack 40. In the battery pack 100g of FIG. 13B, a cooling pipe 20 includes a loop passing through two battery modules 10, and is configured to enable cooling water to pass and cool the two battery modules 10 and then feed back to the cooling pack 40. In the battery pack 100h of FIG. 13C, a cooling pipe 20 includes a loop passing through three battery modules 10, and is configured to enable cooling water to pass and cool the three battery modules 10 and then feed back to the cooling pack 40. In the battery pack 100i of FIG. 13D, a cooling pipe 20 forms a loop passing through four battery modules 10, and is configured to enable cooling water to pass and cool the four battery modules 10 and then feed back to the cooling pack 40.

Figure 6:
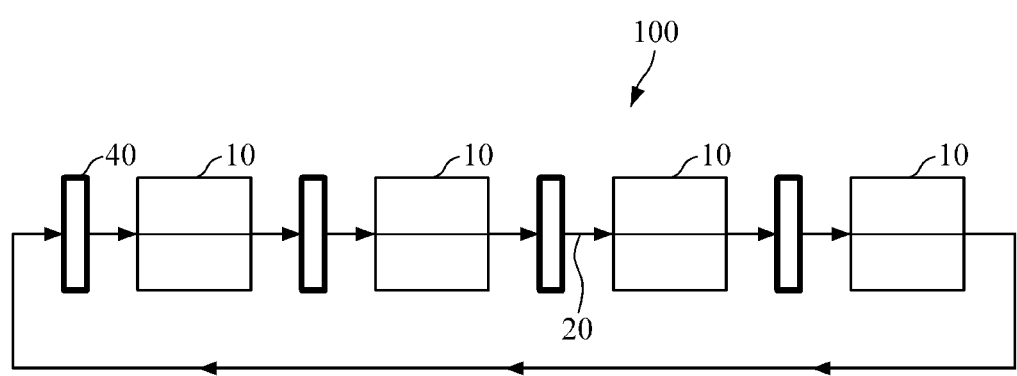
FIG. 6 is a diagram illustrating an example of a flow of cooling water in the battery pack shown in FIG. 5.
Figure 7:
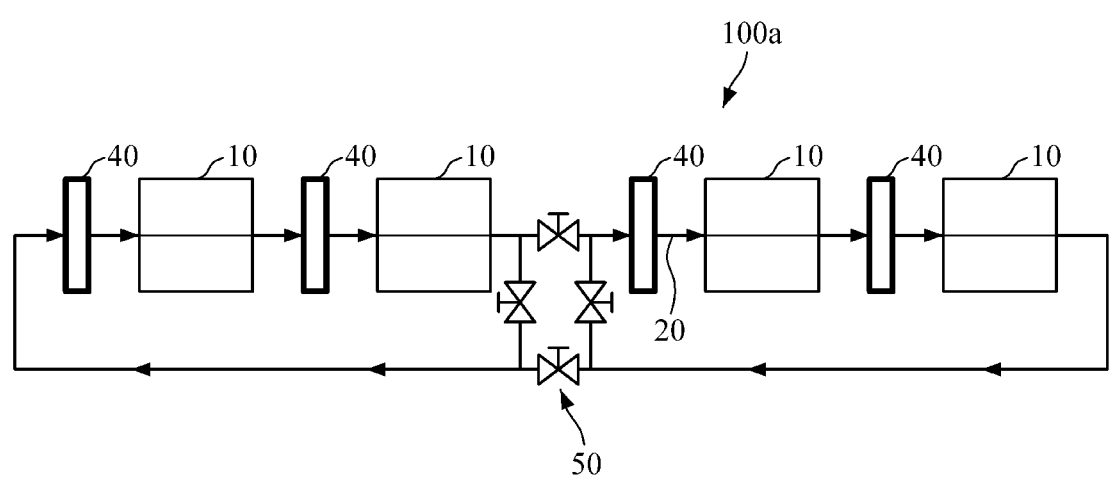
FIG. 7 is a diagram illustrating a flow of cooling water in a battery pack, according to another embodiment.
Figure 8:
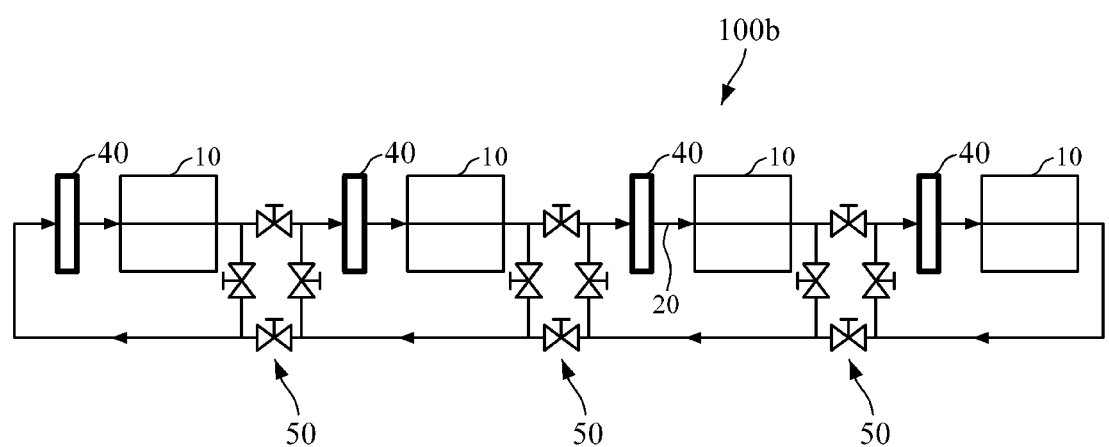
FIG. 8 is a diagram illustrating a flow of cooling water in a battery pack, according to another embodiment.

FIG. 6 illustrates a flow of the cooling water in the battery pack shown in FIG. 5, FIG. 7 illustrates a flow of cooling water in a battery pack 100a, according to another embodiment, and FIG. 8 illustrates a flow of cooling water in a battery pack 100b, according to another embodiment. As shown in FIGS. 6 to 8, a cooling pipe 20 and cooling units 40, which are disposed in alternating sequence with the battery modules 10, are integrally connected to each other to form a single closed loop, or two or more closed loops.

The battery pack 100a of FIG. 7 has the same configuration of battery modules 10 and cooling units 40 provided in the battery pack 100 of FIGS. 5 and 6. However, in the battery pack 100a of FIG. 7, a valve group 50 and a controller (not shown) configured to control the valve group 50 are provided to control a flow of the cooling water. The valve group 50 is disposed between a second battery module 10 and a third cooling unit 40 disposed downstream from the second battery module 10, and includes a plurality of valves. The valves may be solenoid valves which are opened and closed by an electromagnetic force of a coil. By opening or closing certain valves, a single closed loop of the cooling pipe 20 may be integrally formed or two closed loops of the cooling pipe 20 may be formed.

The battery pack 100b is similar to the battery pack 100a of FIG. 7, except that the battery pack 100b includes three valve units 50, each including a plurality of valves. More specifically, a first valve group 50 is disposed between a first battery module 10 and a second cooling unit 40 disposed downstream from the first battery module 10, a second valve group 50 is disposed between a second battery module 10 and a third cooling unit 40 disposed downstream from the second battery module 10, and a third valve group 50 is disposed between a third battery module 10 and a fourth cooling unit 40 disposed downstream from the third battery module 10. By opening or closing certain valves, a single closed loop of the cooling pipe 20 may be integrally formed, or two, or three closed loops of the cooling pipe may be formed. It can be appreciated from the example embodiments of FIGS. 6-8 that any number of battery modules 10 and cooling units 40 may be provided and various numbers and arrangements of valve groups 50 may be provided in order to provide a variable number of closed loops in the cooling pipe 20.

Alternatively, the battery packs 100*a* and 100*b* are partially cooled by controlling the valves. In this case, active cooling may be possible according to a load status so that efficiency of cooling may be improved. Also, a partial cooling is possible so that a capacity of a pump may be reduced and a power requirement may be reduced in comparison to full cooling of the battery pack 100*a* or 100*b*.

Figure 9:
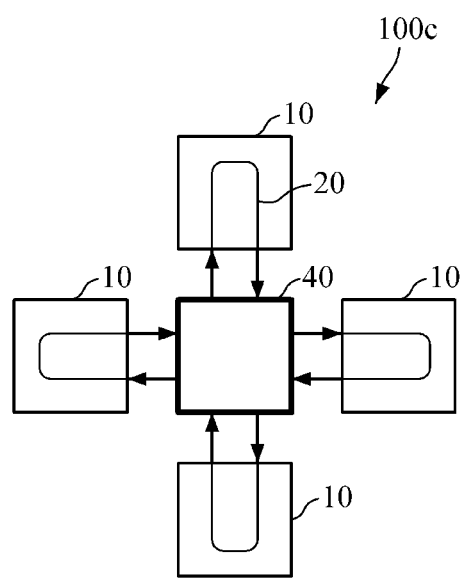
FIG. 9 is a diagram illustrating a flow of cooling water in a battery pack, according to another embodiment.
Figure 10:
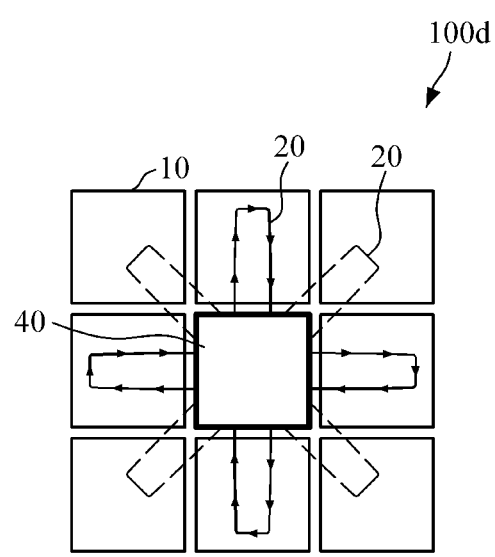
FIG. 10 is a diagram illustrating a flow of cooling water in a battery pack, according to another embodiment.

FIG. 9 illustrates a flow of cooling water in a battery pack 100*c* for a uniform cooling of battery modules 10, according to another embodiment. FIG. 10 illustrates a flow of cooling water in a battery pack 100*d* for a uniform cooling of battery modules 10, according to another embodiment.

With reference to FIGS. 9 and 10, in the battery packs 100*c* and 100*d*, a cooling unit 40 is disposed at a central position, and battery modules 10 are disposed in a pattern surrounding the cooling unit 40. In the battery pack 100*c*, the battery modules 10 are disposed in upper, lower, left, and right directions from the cooling unit 40. In the battery pack 100*d*, the battery modules 10 are disposed in upper, lower, left, right, and diagonal directions from the cooling unit 40. In the battery packs 100*c* and 100*d*, loops of the cooling pipe 20 are disposed between the cooling unit 40 and each battery module 10. The battery packs 100*c* and 100*d* may be configured such that cooling water flows, in one loop of the cooling pipe 20, from the cooling unit 40 to one battery module 10 and then back to the cooling unit 40, then subsequently flows, in a next loop of the cooling pipe 20, to a next battery module 10 and then back to the cooling unit 40, and so on. In other words, the cooling unit 40 and the loops of the cooling pipe 20 may form a continuous cooling circuit in which each battery module is cooled by cooling water flowing directly from the cooling unit 40 and each cooling water exiting each battery module 10 flows directly to the cooling unit 40. Therefore, a refrigerant circulates through peripheral battery modules 10 to absorb heat from the battery modules 10, and flows to the cooling unit 40 located at the central position.

As described above, when the cooling unit 40 is located at the central position and the battery modules 10 are disposed to surround the cooling unit 40, there are advantages in that the battery modules 10 may be uniformly cooled and a size of the battery pack 100*c*/100*d* may be reduced in comparison to conventional battery packs.

Figure 11:
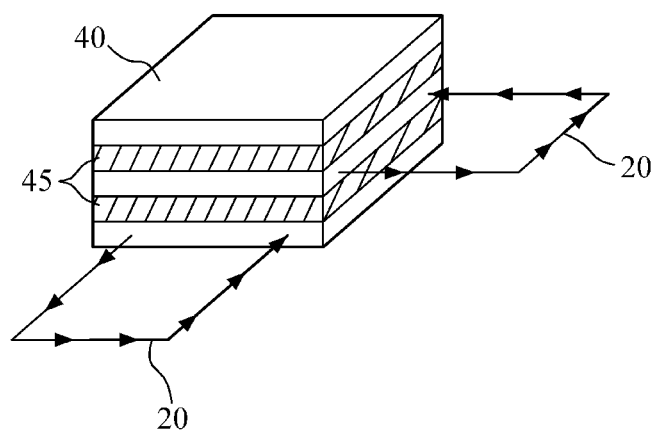
FIG. 11 is a diagram illustrating a flow of cooling water in a battery pack in which a cooling unit is configured in a plate shape, according to an embodiment.

FIG. 11 illustrates a flow of cooling water in a battery pack in which a cooling unit 40 is configured in a plate shape. As shown in FIG. 11, the cooling unit 40 includes vertically stacked and aligned layers of components. For example, the cooling unit 40 includes one or more heat exchangers 45, compressors, condensers, and expansion valves, and the one or more heat exchangers 45 are configured in a plate shape and arranged in a stack with the one or more compressors, condensers, and expansion valves. Therefore, heat exchange may be performed between layers adjacent to each other. That is, in an example, cooling water which circulates in a first loop of a cooling pipe 20, through one battery module 10, and in a first layer of the cooling unit 40, exchanges heat with a heat exchanger 45 of a second layer of the cooling unit 40, and cooling water which circulates in a second loop of the cooling pipe 20, through another battery module 10, and in a third layer of the cooling unit 40, exchanges heat with the heat exchanger 45 of the second layer and a heat exchanger 45 of a fourth layer of the cooling unit 40. Thus, the cooling water in the first and second cooling pipes 20 is cooled.

Figure 12A:
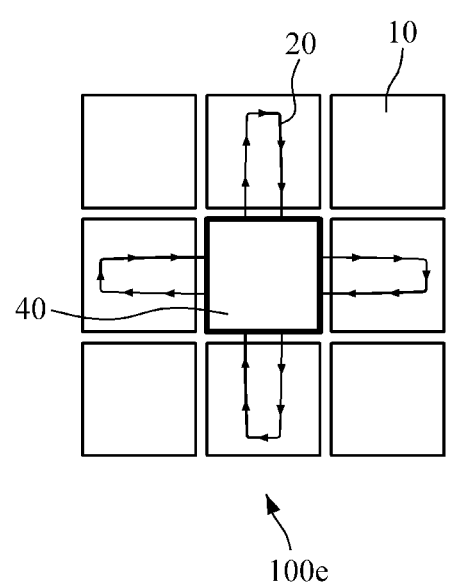
FIGS. 12A and 12B are diagrams illustrating a flow of cooling water in a battery pack, according to another embodiment.
Figure 12B:
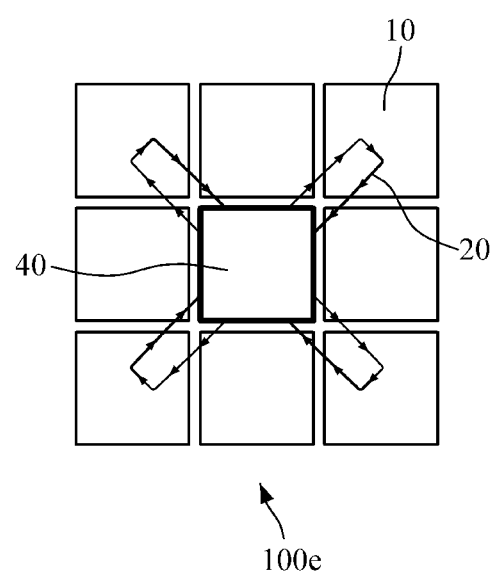
Figure 13A:
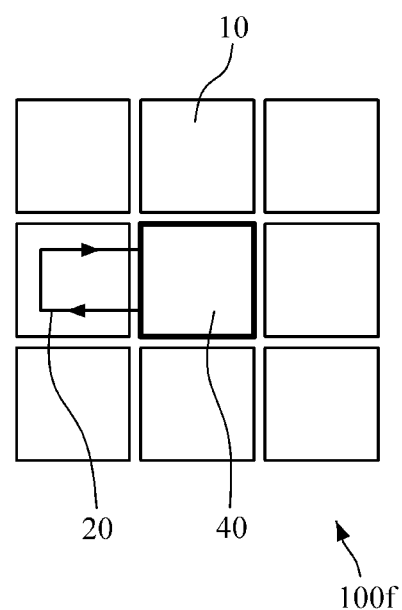
FIGS. 13A-13D are diagrams illustrating a flow of cooling water in battery packs, according to other embodiments.
Figure 13B:
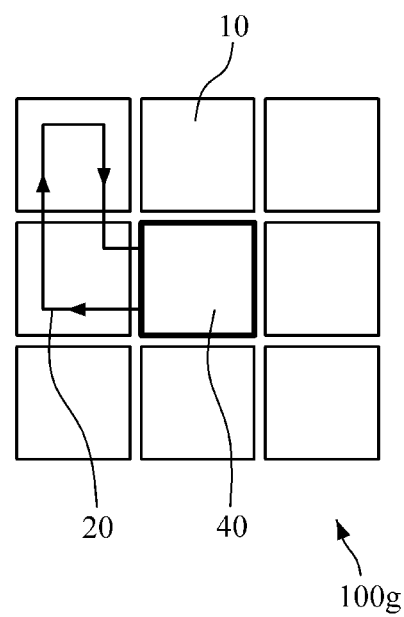
Figure 13C:
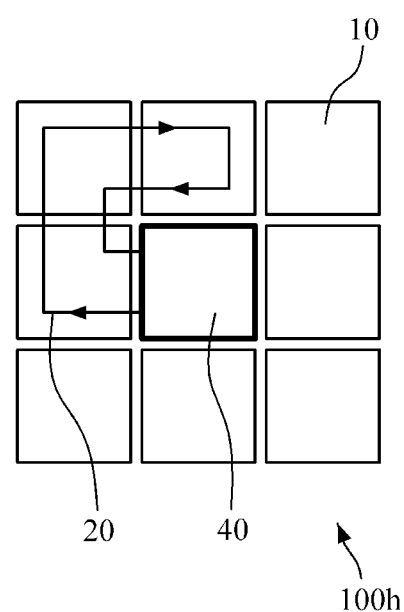
Figure 13D:
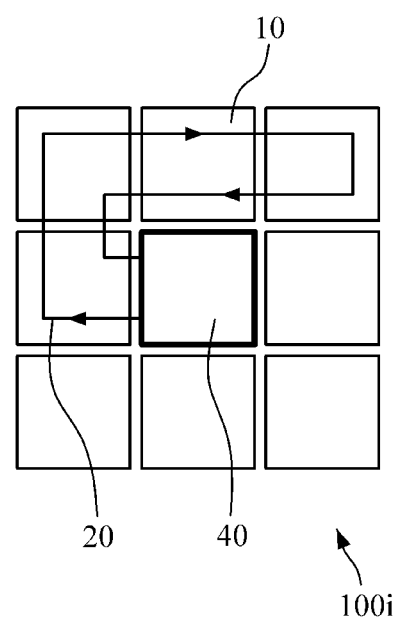

FIGS. 12A and 12B illustrate a flow of cooling water in a battery pack 100*e*, according to another embodiment. As shown in FIGS. 12A and 12B, a cooling unit 40 is disposed at a central position, and battery modules 10 are disposed in a pattern surrounding the cooling unit 40. Cooling water circulating in upper, lower, left, and right directions from the cooling unit 40 and cooling water circulating in diagonal directions from the cooling unit 40 form closed loops different from each other. That is, a first loop of the cooling pipe 20 is configured to circulate cooling water in the upper, lower, left, and right directions, and a second loop of the cooling pipe 20 is configured to circulate cooling water in the diagonal directions. A particular battery module 10 located at a position requiring cooling may be cooled through the operation of a controller and a valve controlled by the controller. Thus, active cooling based on a load status is possible so that efficiency of cooling may be improved.

Figure 14:
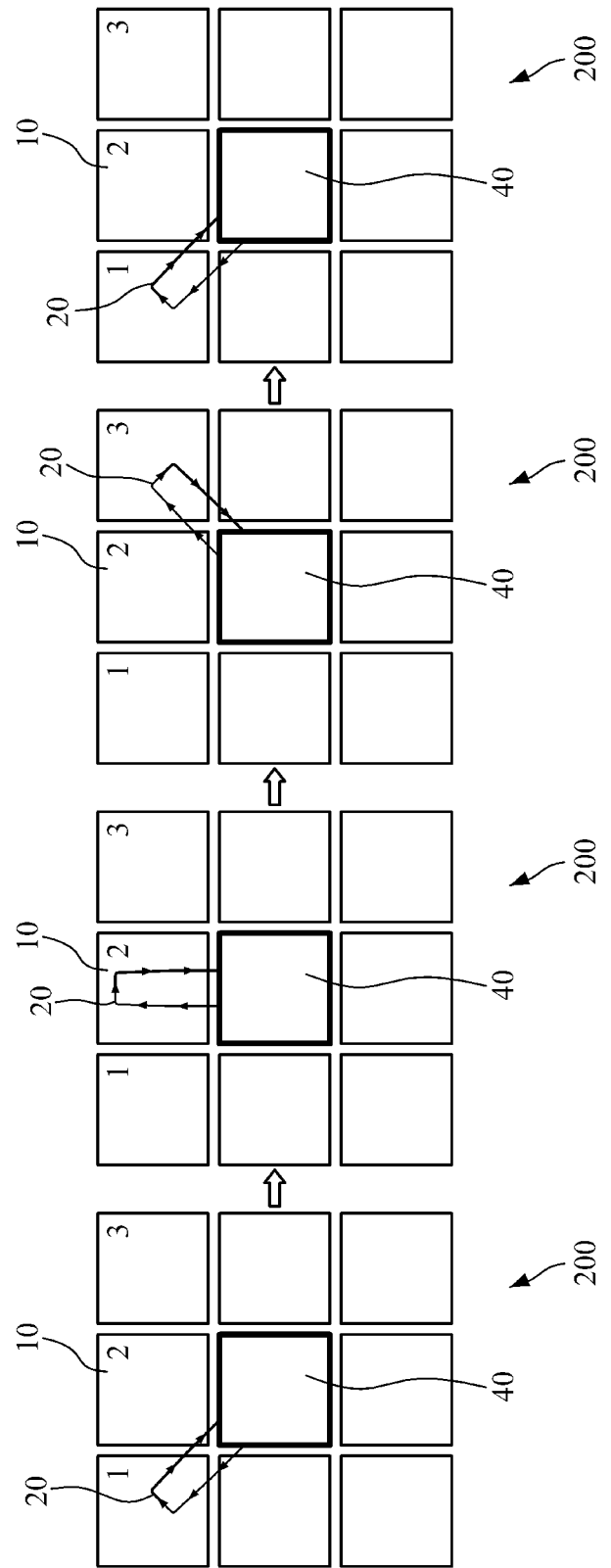
FIG. 14 is a diagram illustrating a cooling method of a battery pack, according to an embodiment.

FIG. 14 illustrates a cooling method of a battery pack 200, according to an embodiment. As shown in the sequence of views in FIG. 14, in the battery pack 200, battery modules 10 are cooled in a fixed order of 1→2→3→1→2 . . . , regardless of a load status and an operating circumstance. However, such a cooling method may have difficulty in actively responding to an occurrence of a temperature deviation between the battery modules 10. Also, since cooling is continuously performed regardless of a load, energy efficiency is not optimized.

Figure 15:
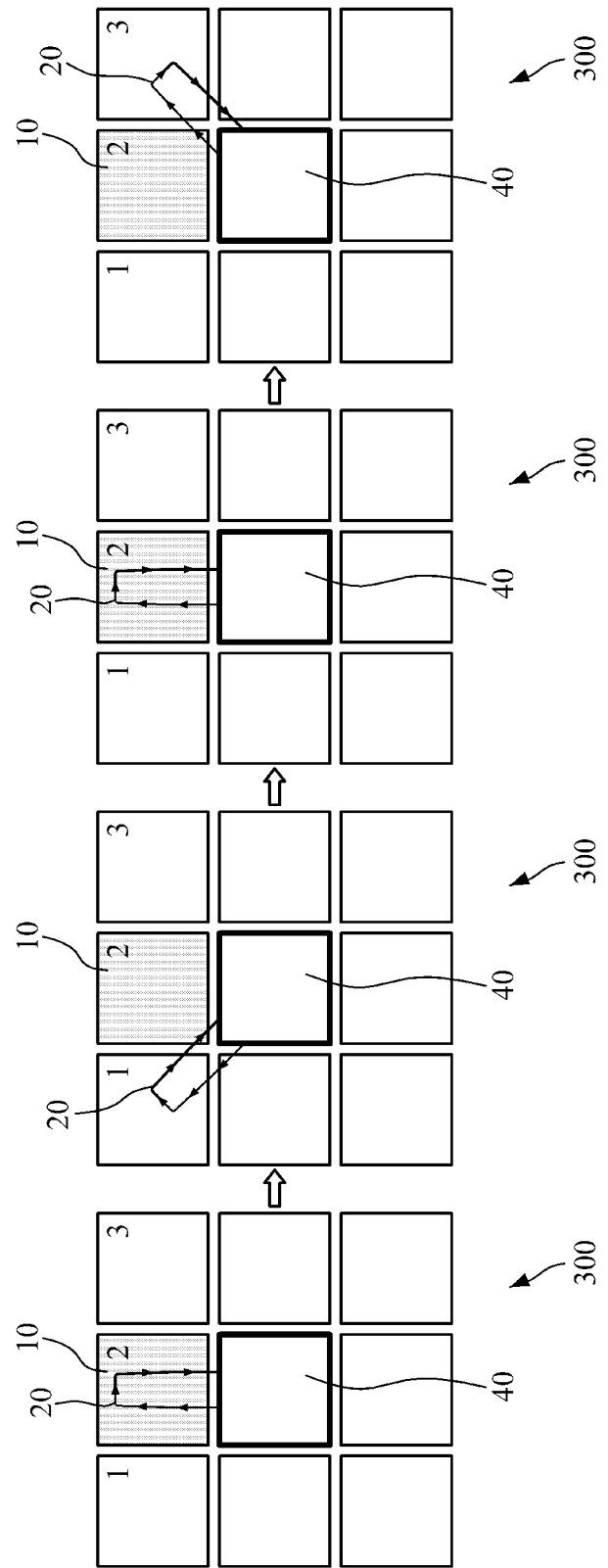
FIG. 15 is a diagram illustrating a cooling method of a battery pack, according to another embodiment.

FIG. 15 illustrates a cooling method of a battery pack 300, according to another embodiment. First, a temperature sensors measure a temperature of each battery module 10. A temperature sensor may be attached to each of the battery modules 10 so as to measure a temperature thereof. The temperature sensor may be a temperature measuring resistor or a thermistor, but it is not limited thereto, and the temperature sensor may be any kind of temperature sensor.

Then, measured temperature information of each of the battery modules 10 is transmitted to a controller. The temperature information may be transmitted by a wired or wireless communication.

Next, the controller generates a valve control signal in response to receiving the temperature information. More specifically, the controller, in response to receiving the temperature information of each of the battery modules, derives an optimal flow of cooling water through an arithmetic operation. The controller then generates ON/OFF (e.g., open/close) control signal of a valve to enable the cooling water to perform the optimal flow.

Thereafter, the valve operates according to the valve control signal of the controller. The valve may be a solenoid valve which is opened and closed by an electromagnetic force of a coil so as to enable the valve to be operated according to the valve control signal of the controller. The cooling water flows to cool each of the battery modules 10 in communication with the flow of the cooling water determined by the valve control signal.

Therefore, as shown in FIG. 15, for example, when a second battery module 10 generates significantly more heat than other battery modules 10, the cooling water flows in an order of 2→1→2→3 . . . (where the numbers 1, 2 and 3 correspond to first, second and third battery modules) to cool the second battery module 10 more than the other battery modules 10. That is, within a cooling cycle of the battery pack 300, the cooling water flows to the second battery module 10 a greater number of times than the cooling water flows to the other battery modules 10.

When following the method disclosed above, active cooling may be performed according to a status of the battery module 10 so that efficiency of cooling may be improved. Also, a partial control may be possible so that a capacity of a pump may be miniaturized and a power requirement may be reduced.

It is noted that, while various disclosure describes cooling of a battery pack in various embodiments by using "cooling water," cooling liquids other than water may be used.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery pack, comprising:
   battery modules;
   a cooling pipe connected to the battery modules; and
   one or more cooling units connected to the cooling pipe and configured to absorb heat from cooling liquid flowing inside the cooling pipe,
   wherein the battery modules and the one or more cooling units are disposed to alternate with respect to each other, and
   wherein the battery modules and the one or more cooling units are disposed to alternate with each other in a one-by-one order to enable the cooling liquid to flow through a cooling unit among the one or more cooling units after passing through a battery module among the battery modules.

2. The battery pack of claim 1, wherein the cooling pipe and the one or more cooling units are connected to each other to form a closed loop.

3. The battery pack of claim 1, wherein the one or more cooling units comprise a central cooling unit disposed at a central position and the battery modules comprise battery modules disposed in positions surrounding the central cooling unit.

4. The battery pack of claim 3, wherein the battery modules disposed in positions surrounding the central cooling unit are disposed in upper, lower, left, right, and diagonal directions from the central cooling unit.

5. The battery pack of claim 4, wherein the central cooling unit comprises layers of components that are vertically stacked and aligned.

6. The battery pack of claim 5, wherein:
   the central cooling unit further comprises
      a first heat exchanger disposed in a layer among the layers of components, and
      a second heat exchanger disposed in another layer among the layers of components; and
   the cooling pipe comprises
      a first loop configured to circulate the cooling liquid to a first battery module among the battery modules disposed in the positions surrounding the central cooling unit, and to exchange heat with the first heat exchanger, and
      a second loop configured to circulate the cooling liquid to a second battery module among the battery modules disposed in the positions surrounding the central cooling unit, and to exchange heat with the first heat exchanger and the second heat exchanger.

7. The battery pack of claim 1, wherein the cooling pipe and the one or more cooling units form two or more closed loops in which to flow the cooling liquid.

8. The battery pack of claim 1, further comprising:
   a valve disposed between the battery modules and the one or more cooling units, and configured to control a flow of the cooling liquid.

9. The battery pack of claim 1, further comprising:
   a temperature sensor configured to measure a temperature of each of the battery modules.

10. The battery pack of claim 9, further comprising:
    a valve; and
    a controller configured to control the valve based on the measured temperature of each of the battery modules.

11. A battery pack, comprising:
    battery modules;
    a cooling pipe connected to the battery modules;
    one or more cooling units connected to the cooling pipe and configured to absorb heat from cooling liquid flowing inside the cooling pipe;
    a temperature sensor configured to measure a temperature of each of the batter modules;
    valves; and
    a controller configured to control the valves based on the measured temperature of each of the battery modules,
    wherein the battery modules and the one or more cooling units are disposed to alternate with respect to each other, and
    wherein the controller is configured to control the valves to selectively configure the cooling pipe and the one or more cooling units to form one closed loop or closed loops through which the cooling liquid flows.

* * * * *